United States Patent [19]
Fricker et al.

[11] 3,728,601
[45] Apr. 17, 1973

[54] TRIGGER DIODE CONTROLLED MOTOR STARTING SYSTEM

[75] Inventors: David C. Fricker, Hurst; Thomas F. Whittaker, Forth Worth, both of Tex.

[73] Assignee: ECC Corporation, Euless, Tex.

[22] Filed: Sept. 3, 1971

[21] Appl. No.: 177,576

[52] U.S. Cl. .............................. 318/221 E, 318/227
[51] Int. Cl. ................................................ H02p 1/44
[58] Field of Search ................. 318/221 E, 221 R, 318/227

[56] References Cited
UNITED STATES PATENTS 3,538,411  11/1970  Knauer et al...................318/221 E

*Primary Examiner*—Gene Z. Rubinson
*Attorney*—Giles C. Clegg, Jr. et al.

[57] ABSTRACT

A speed responsive motor starting system includes a bilateral triode switch connected in series with the motor start winding for controlling the current flow therethrough. A first bilateral trigger diode is connected to the control electrode of the triode switch for supplying enabling current thereto. The first bilateral trigger diode is connected to a capacitor which provides the enabling current and to a second bilateral trigger diode connected to a voltage divider. A current-sensing transformer is coupled in circuit with the motor run winding and with the voltage divider for controlling the voltage applied to the voltage divider, and thus for controlling the voltage necessary to trigger the first bilateral trigger diode in accordance with the motor speed. Phase compensating capacitors are provided to advance the phase angle of the voltage which triggers the first bilateral trigger diode.

9 Claims, 1 Drawing Figure

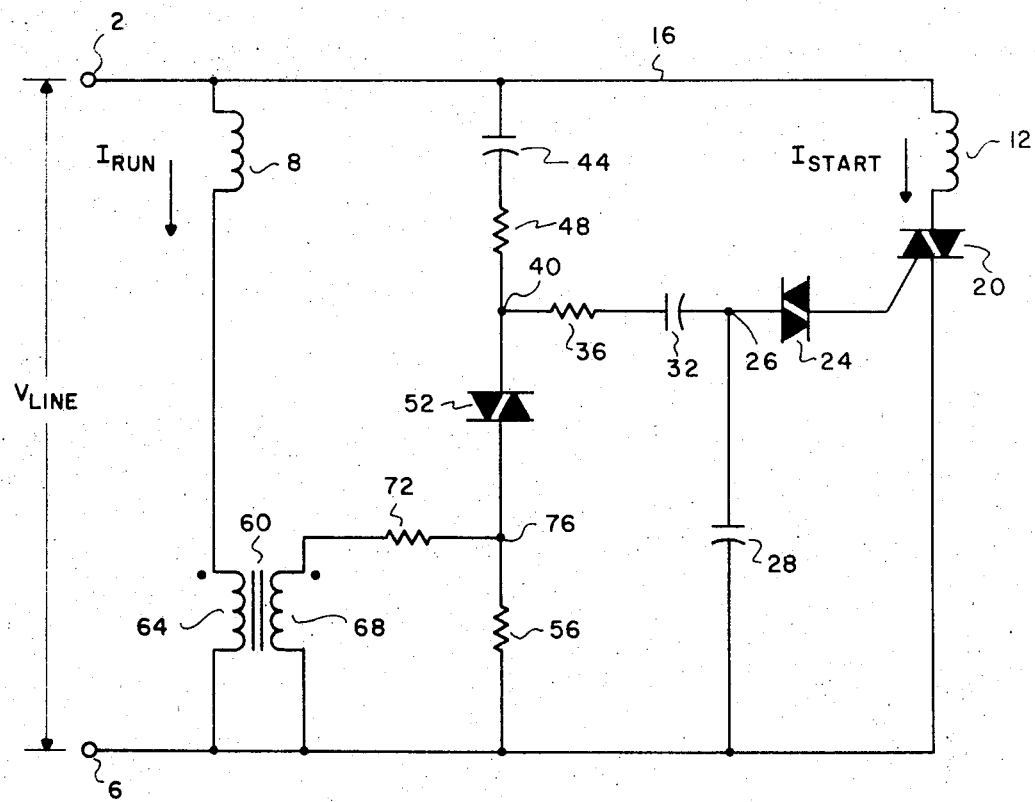

TRIGGER DIODE CONTROLLED MOTOR STARTING SYSTEM

BACKGROUND OF THE INVENTION

This invention relates to speed responsive motor starting circuits and, more particularly, to bilateral trigger diode controlled motor starting circuits.

Solid state motor starting circuits have generally utilized current sensing to determine the speed of the motor so that when a certain speed is reached, power to the starting system or start winding can be removed. In solid state circuits utilizing resistive sensing, typically a bilateral semiconductor switching device is connected in series with the starting winding of the motor and a current sensing resistor is connected in series with the run winding of the motor. The current-sensing resistor is utilized to determine the current amplitude through the run winding and thus determine the speed of the motor and to enable the semiconductor switching device to conduct line current therethrough to the start winding when the motor speed is below a prescribed minimum value. One disadvantage of resistive sensing is that excessive power dissipation is caused by the current sensing resistor. The heat generated by the resistor usually makes it necessary to locate the sensing resistor externally to the motor housing, which may be costly and inconvenient.

In circuits utilizing transformer sensing, the primary winding of a transformer, rather than the current sensing resistor, is connected in series with the run winding of the motor to induce a current in a secondary winding of the transformer when current flows through the motor run winding. The transformer thus serves to detect the current amplitude in the run winding and accordingly to enable or disable the current flow through the bilateral semiconductor switching device and start winding. A possible disadvantage of the above-type circuit, arising not from the method of sensing but rather from the use of semiconductor switching devices, is that of temperature dependence. Specifically, the control signal level required to "trigger" the switching device often varies with a variation in temperature. Temperature variation thus might cause the switching device to either continually conduct or not conduct at all, neither situation, of course, being desirable.

Another possible disadvantage of motor starting circuits of the foregoing type is that they are designed to apply power to and remove power from the start winding at fixed current amplitudes through the run winding. Thus, the circuits normally could not be efficiently used in motors having power and current ratings different from that for which the circuits were designed and the circuits generally cannot be easily adapted for use in such different motors. Finally, a relatively large transformer was required in prior art circuits to develop the voltage necessary to trigger the switching device.

SUMMARY OF THE INVENTION

It is an object of the invention to provide a speed responsive motor starting system whose operation is substantially independent of temperature variations.

It is also an object of the present invention to provide such a system which may be easily adapted for use in motors having various power ratings.

It is another object of the present invention to provide a transformer sensing motor starting system which requires only a relatively small transformer developed voltage to effectuate starting.

It is a further object of the present invention to provide a speed responsive motor starting system whose operation is not significantly affected by variations in the value of the alternating current line voltage.

It is still a further object of the present invention to provide a new and improved solid state speed responsive motor starting system.

These and other objects of the present invention are realized in a specific illustrative motor starting circuit which includes a bilateral triode switch whose power electrodes are connected in series with a motor start winding. The trigger switch is triggered to conduct current through the start winding when current is applied by a capacitor via a bilateral trigger diode to the control electrode of the switch. The trigger diode is, in turn, triggered to conduct current when a certain voltage is developed across a second bilateral trigger diode and a resistor connected in series. A current sensing transformer is coupled in circuit with the motor run winding to control the voltage developed across the resistor in accordance with the speed of the motor. Trigger diodes which are substantially temperature independent can be chosen so that the triggering of the triode switch will not be affected by temperature variations. Further, by selecting the value of the resistor, the motor starting circuit can be used in various motors having a wide range of power and current ratings with no additional changes in the motors or starting circuit being required.

BRIEF DESCRIPTION OF THE DRAWING

The above and other objects and advantages of the present invention will become more apparent from the following detailed description presented in connection with the accompanying drawing which shows a specific illustrative motor starting circuit constructed in accordance with the present invention.

DETAILED DESCRIPTION

The circuit shown in the drawing includes a run winding 8 and a start mechanism represented by a start winding 12 of a typical split phase alternating current induction motor. Both windings are connected to a conductor 16 which connects to one terminal 2 of a pair of alternating current power supply terminals 2 and 6.

A bilateral triode switch 20 is connected in series with the start winding 12, one power electrode of the triode switch 20 being connected to the winding 12 and the other power electrode being connected to the winding 12 and the other power electrode being connected to the terminal 6. The operation of the triode switch 20 is controlled by the flow of current through a bilateral trigger diode 24 to the control electrode of the switch 20. The trigger diode 24 is connected to one plate of a so-called energy dump capacitor 28, the other plate of which is connected to the teminal 6. The trigger diode 24 is also connected in series with a second capacitor 32 and a resistor 36 to a node 40. The voltage at node 40 serves to control the operation of the trigger diode 24—either enabling it to conduct current or disabling it from conducting current depending upon the voltage level at node 40.

A capacitor 44 and a resistor 48 connected in series interconnect the node 40 to the power supply terminal 2. A second bilateral trigger diode 52 connected in series with a resistor 56 interconnects the node 40 to the other power supply terminal 6. The voltage across the trigger diode 52 and the resistor 56 determines the voltage level at the node 40.

The voltage across the trigger diode 52 is a function of the line voltage while the voltage across resistor 56 is controlled by current sensing means represented by a current transformer 60. The current transformer 60 includes a first or primary winding 64 connected in series with the motor run winding 8. A second or output winding 68 is coupled via a resistor 72 to a node 76 interconnecting the trigger diode 52 and the resistor 56. As indicated by the dots on the windings of the transformer 60, when the upper end of the primary winding 64 is positive, the upper end of the secondary winding 68 is also positive and vice versa. The operation of the circuit of the drawing will now be described.

The magnitude of the current $I_{run}$ flowing through the motor run winding 8 varies inversely with the speed of rotation of the motor. When the rotor of the motor is stationary, the current $I_{run}$ is maximum but as the motor picks up speed, the current level decreases. It should be noted here that because of the inductive nature of the run winding 8, the current $I_{run}$ lags the line voltage $V_{line}$ applied to the terminals 2 and 6. The capacitors 44 and 32 compensate for this time lag as will be discussed later.

The current transformer 60 operates to sense the magnitude of the current flowing through the run winding 8 and in response thereto develops across the secondary or output winding 68 an alternating current voltage which is proportional in magnitude to the magnitude of the run winding current $I_{run}$. This voltage across the secondary winding 68 causes a current flow through the resistor 72 and through the resistor 56 thereby increasing the voltage drop across the resistor 56. The trigger diode 52, because of its internal construction, provides a substantially fixed voltage drop thereacross once the breakover voltage of the diode is reached. This substantially fixed voltage is known as the breakback voltage and is generally somewhat less than the breakover voltage. As indicated earlier, the voltage across the trigger diode 52 is developed as a result of the voltage on line 16. This voltage drop across the trigger diode 52 and the voltage drop across resistor 56 are vectorally summed at node 40. Since the voltage drop across the trigger diode 52 is substantially fixed once the breakover voltage is reached, the voltage developed at node 40 is effectively determined by the voltage drop across the resistor 56 and thus by the run winding current $I_{run}$.

Raising the voltage level at node 40 causes an increase in the voltage level at node 26 which, when it reaches the breakover voltage level of the trigger diode 24, conditions the diode to conduct current. When the trigger diode 24 is placed in a conductive condition, a portion of the current stored on the capacitor 28 flows through the trigger diode 24 to the control electrode of the triode switch 20. This current enables the triode switch 20 to conduct current between its power electrodes. The current through the triode switch 20 may flow in either direction, depending upon the polarity of the line voltage at the moment in question. With the switch 20 enabled to conduct current, start winding current $I_{start}$ is allowed to flow through the start winding 12 to provide starting torque for the motor.

At the end of each half cycle of the power signal applied to the terminals 2 and 6, when the current through the switch 20 reaches zero level, the switch 20 turns off. Then, at the start of the next half cycle, the operation described above is repeated except that the polarities of the currents and induced voltages are opposite those of the immediately preceding half cycle.

Ideally, the triode switch 20 would become conductive at the precise point at which each half cycle begins so that maximum power would be applied to the start winding 12 thus providing maximum starting torque. In practice, however, there is generally a short time lag in triggering the triode switch 20 after the beginning of each half cycle. Consequently, the current flow through the start winding 12 will have a waveform characterized by a zero level notch immediately following the beginning of each half cycle. This triggering time lag results because the voltage induced in the secondary winding 68 of the transformer 60, which causes the trigger diode 24 to become conductive, lags in phase the line voltage. To compensate for this lag, the capacitor 44 and resistor 48 and the resistor 36 and capacitor 32 are provided to advance the phase angle of the voltage applied to node 26.

As the motor speed increases, the run winding current $I_{run}$ decreases and a point is soon reached when the voltage induced in the secondary winding 68 is insufficient to cause the diode 24 to trigger. When this point is reached, the switch 20 is disabled so that no current flows through the start winding 12. The torque for driving the motor is then provided only by the run winding 8.

The circuit of the drawing is substantially temperature independent. Since the breakover voltage of the bilateral trigger diode 24 is relatively unaffected by temperature changes, the bilateral triode switch 20 will be triggered at the appropriate time regardless of the effect of temperature changes on the triode switch 20. (The magnitude of current necessary to trigger triode switches varies inversely with the temperature. Thus, if the control circuitry for controlling the operation for the switch 20 were such that a gradually increasing current were applied to the control electrode, variations in temperature might result in the switch 20 being triggered either continually or not at all depending on the direction of the temperature variation.

The values of resistors 56 or 72, or both, may be selected to provide whatever voltage is desired at node 40 for a given current through the run winding 8. Thus, if the circuit of the drawing were used with a motor having a fairly low power and current rating, the resistor 56 would be chosen to provide a greater voltage at node 40 so that the low start-up current of the motor would still cause the diode 24 to trigger thereby enabling the triode switch 20 to conduct. On the other hand, if the circuit of the drawing were used with a motor having a high power and current rating, resistor 56 would be chosen to provide a lower voltage at node 40.

Due to the "voltage drop" contribution of the trigger diode 52, the transformer 60 need only develop a relatively small voltage drop across resistor 56 to trigger the diode 24 and the triode switch 20. Because of this, a relatively small transformer may be employed for transformer 60.

Although a specific illustrative embodiment of the invention has been described, it will be obvious to those skilled in the art that various changes and modifications may be made therein without departing from the spirit and scope of the invention. The following claims are intended to cover such changes and modifications.

What is claimed is:

1. In a motor system including a run winding, a start winding and an A. C. supply, a speed responsive motor starting circuit comprising:

a bilateral triode switch having two power electrodes and a control electrode, said power electrodes being connected in series with said start winding;

a capacitor;

means for charging said capacitor;

a first bilateral trigger diode, a first electrode of which is connected to the control electrode of said triode switch and a second electrode of which is connected to said capacitor, said first bilateral trigger diode being responsive to a certain voltage applied to said second electrode for conducting gating current from said capacitor to said control electrode;

current sensing means responsive to the current flowing through said run winding for generating a voltage; and means responsive to the voltage generated by said current sensing means for applying a voltage to said second electrode, said voltage applying means comprising first resistive means connected to said current sensing means and a second bilateral trigger diode, a first electrode of which is connected to said first resistive means and a second electrode of which is connected in circuit with the second electrode of said first bilateral trigger diode.

2. The circuit of claim 1 wherein said voltage applying means further comprises second resistive means interconnecting the first electrode of said second bilateral trigger diode with one terminal of said A. C. supply.

3. In a motor system including a run winding, a start winding and an A. C. supply, a speed responsive motor starting circuit comprising:

a bilateral triode switch having two power electrodes and a control electrode, said power electrodes being connected in series with said start winding;

a capacitor;

a first bilateral trigger diode, a first electrode of which is connected to the control electrode of said triode switch and a second electrode of which is connected to said capacitor, said first bilateral trigger diode being responsive to a certain voltage applied to said second electrode for conducting gating current from said capacitor to said control electrode;

current sensing means responsive to the current flowing through said run winding for generating a voltage;

means responsive to the voltage generated by said current sensing means for applying a voltage to said second electrode; and means for charging said capacitor and for advancing the phase angle of the voltage applied by said voltage applying means to the second electrode of said first bilateral trigger diode to thereby reduce the notch effect in the current flowing through said start winding.

4. The circuit of claim 3 wherein said capacitor charging and phase angle advancing means comprises a second capacitor and a first resistor connected in series and interconnecting said voltage applying means and one terminal of said A. C. supply with the second electrode of said first bilateral trigger diode.

5. The circuit of claim 4 wherein said capacitor charging and phase angle advancing means further comprises a third capacitor and a second resistor connected in series and interconnecting said one terminal of said A. C. supply with said voltage applying means and with said second capacitor and first resistor.

6. A speed responsive motor starting circuit for use with motor systems which include a run winding, a start mechanism, and an A. C. power supply, said circuit comprising:

a bilateral triode switch whose power electrodes are connected in series with said start mechanism;

a first bilateral trigger diode for applying current to the control electrode of said triode switch in response to a triggering voltage supplied to one electrode of said first bilateral trigger diode to thereby enable said triode switch to conduct current between its power electrode;

means for supplying a triggering voltage to said one electrode of said first bilateral trigger diode, the amplitude of said triggering voltage corresponding to a voltage induced across said voltage supplying means;

current sensing means coupled in circuit with said run winding for inducing a voltage across said voltage supplying means proportional to the amplitude of the current flowing through said run winding; and means for supplying current to said first bilateral trigger diode comprising a first capacitor connected to said one electrode of said first bilateral trigger diode, a second capacitor and a first resistor connected in series with said one electrode of said first bilateral trigger diode for advancing the phase angle of the triggering voltage supplied to said one electrode of said first bilateral trigger diode, and a third capacitor and a second resistor connected in series and interconnecting said second capacitor and first resistor in series with one terminal of said A. C. power supply for further advancing the triggering voltage supplied to said one electrode of said first bilateral trigger diode.

7. The circuit of claim 6 wherein said voltage supplying means comprises a voltage divider connected to said current sensing means, and a second bilateral trigger diode, a first electrode of which is connected to the junction connecting said second capacitor and first resistor with said third capacitor and second resistor and a second electrode of which is connected to said voltage divider.

8. The circuit of claim 7 wherein said voltage divider comprises a first resistor interconnecting said current sensing means and the second electrode of said second bilateral trigger diode and a second resistor interconnecting the second electrode of said second bilateral trigger diode with the other terminal of said A. C. supply.

9. The circuit of claim 8 wherein said current sensing means comprises a transformer having a first winding connected in series with said run winding and a second winding interconnecting said first resistor with said other terminal of said A. C. supply.

* * * * *